United States Patent Office 3,509,102
Patented Apr. 28, 1970

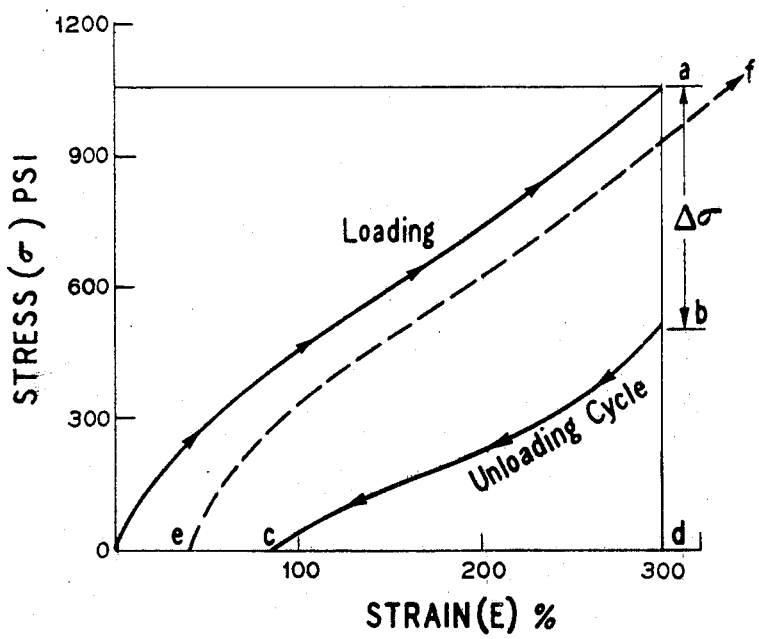

3,509,102
ELASTIC FIBERS PREPARED FROM EPSILON-CAPROLACTONE-BASED DIOL, AN ORGANIC DIISOCYANATE, AND A DIAMINE
Christian F. Horn, Stamford, Conn., and George Magnus, Charleston, W. Va., assignors to Union Carbide Corporation, a corporation of New York
Continuation-in-part of application Ser. No. 290,080, June 24, 1963. This application May 28, 1964, Ser. No. 371,075
Int. Cl. C08g 22/10
U.S. Cl. 260—77.5
15 Claims

ABSTRACT OF THE DISCLOSURE

There is disclosed elastic fibers produced by the steps of preparing a substantially linear hydroxyl-terminated organic polymer containing at least about 50 mole percent of epsilon-caprolactone residues, reacting said polymer with an excess of an organic diisocyanate to produce an isocyanato-terminated prepolymer, and then reacting the prepolymer with a difunctional curing agent.

---

This application is a continuation-in-part of application Ser. No. 290,080, filed June 24, 1963, now abandoned.

The invention relates to novel elastic polymers prepared from an epsilon-caprolactone and to stabilized solutions from which said novel elastic polymers can be produced. In one aspect, the invention relates to novel elastic films and fibers that are derived from hydroxyl-terminated organic polymers that contain at least about 50 mole percent of carbonylpentamethyleneoxy units, i.e.,

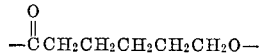

units. In another aspect, the invention relates to acid-stabilized solutions from which the novel elastic films and fibers of the invention can be cast or spun. In a further aspect, the invention relates to a novel process for producing the novel elastic polymers. Many of the novel elastic films and fibers of the invention possess outstanding and exceptional properties and often a combination of properties heretofore elusive in many of the prior art elastic films and fibers.

The production of elastic films and fibers has been increasing rapidly during recent years. One of the most prominent of the elastic fibers, for example, that have attained commercial importance are those that are derived from poly(tetramethylene oxide) polyethers. Despite certain alleged deficiencies such as impairment of elastic properties at low temperature, the said elastic fibers that are derived from poly(tetramethylene oxide) polyethers have heretofore remained more important commercially than the elastic fibers derived from polymers containing ester groups. Illustrative of the latter class of elastic fibers are those that are described in the Schilit patent (U.S. Patent No. 3,097,192) wherein conventional polyesters prepared by reacting a molar excess of glycol with, for example, a dicarboxylic acid are employed to produce elastic fibers. Such elastic fibers prepared from conventional polyesters have not been as important commercially as the aforementioned polyether-based elastic fibers principally for the reason that the polyether-based elastic fibers apparently possess tension set properties that are superior to any of the other elastic fibers heretofore available.

In accordance with the present invention, it has been discovered that elastic films and fibers derived from hydroxyl-terminated organic polymers that contain at least about 50 mole percent of carbonylpentamethyleneoxy units can possess exceptional tension set properties as well as many other desirable properties. In addition to the surprisingly low tension set properties, many of the novel elastic fibers of the invention are characterized by exceptional resistance to fume aging (i.e., resistance to breakdown caused by nitrous oxide, an impurity that is commonly found in the atmosphere), excellent hydrolytic stability, good stability to oxidizing agents such as chlorine bleach, good elongation, tensile and modulus properties, and/or a surprisingly high degree of flame resistance, and many other desirable properties.

A major point of novelty of the elastic films and fibers of the invention, and thus a major contributing factor to the comparatively outstanding properties which characterize said elastic films and fibers, resides in the aforementioned hydroxyl-terminated organic polymers that contain at least about 50 mole percent of carbonylpentamethyleneoxy units in the linear chain or backbone thereof. It is highly essential that these hydroxyl-terminated organic polymers possess the following characteristics:

(a) At least about 50 mole percent of carbonylpentamethyleneoxy units, (b) A molecular weight greater than about 700, for example, greater than about 700 and up to about 5000, and higher, (c) A hydroxyl number below about 170, for example, in the range of from about 20 to about 170, and (d) A melting point below about 75° C., and preferably below about 55° C.

In contrast to the elastic films and fibers heretofore available the elastic films and fibers of the invention are derived from a hydroxyl-terminated organic polymer that contains at least 50 mole percent of carbonylpentamethyleneoxy units in the linear backbone or chain of said polymer. The said hydroxyl-terminated organic polymer that is employed to produce the elastic films and fibers of the invention can be represented by Formula I:

(I)     HO—L—OH (a) wherein L represents a divalent organic group that contains at least about 50 mole percent of carbonylpentamethyleneoxy units, (b) wherein the aforesaid polymer HO—L—OH has a molecular weight of greater than about 700, (c) wherein the hydroxyl number of the polymer represented by HO—L—OH is less than about 170 (as is known in the art, hydroxyl number is defined by the equation):

$$OH = \frac{56.1 \times 1000 \times f}{M.W.}$$

wherein

OH = hydroxyl number
$f$ = functionality, i.e., number of hydroxyl groups
M.W. = molecular weight and, (d) wherein the melting point of the polymer represented by HO—L—OH is below about 75° C.

In certain preferred embodiments of the invention, the said hydroxyl-terminated organic polymer will possess, in addition to the aforesaid characteristics:

(1) At least about 5 mole percent of a divalent organic group that contains a pendant substituent group that is essentially non-reactive with isocyanate, or which is unsymmetrical, or both, and/or (2) A Poisson molecular weight distribution.

Accordingly, one or more of the following objects will be obtained by the practice of the invention.

It is an object of the present invention to provide novel elastic polymers prepared from an epsilon-caprolactone.

It is another object of the invention to provide novel elastic fibers that are prepared from hydroxyl-terminated organic polymers that contain at least about 50 mole percent of the carbonylpentamethyleneoxy unit.

Another object of the invention is to provide acid-stabilized solutions from which novel elastic films and fibers can be prepared.

A further object of the invention is the provision of lactone-based elastomers.

A still further object of the invention is the provision of a novel process for producing elastic films and fibers.

Additional objects of the invention will be apparent from the description below.

Broadly, the elastic films and fibers of the invention can be produced by a process that can be summarized as follows:

(1) The aforementioned hydroxyl-terminated organic polymer HO—L—OH reacted with a stoichiometric excess of an organic diisoycanate to form an isocyanato-terminated polymer. For simplification, this isocyanato-terminated polymer will subsequently be referred to as a "prepolymer."

(2) The prepolymer is then reacted with a difunctional compound that has two groups containing labile or reactive hydrogen. For brevity, said compound will be referred to as a "curing compound." Illustrative curing compounds include diamine such as ethylene-diamine, various diols, water, aminoalcohols, and the like.

In Step (1), above, by the term "stoichiometric excess" of organic diisoycanate, it is meant that the organic diisocyanate is employed in a quantity such that there is present in the reaction mixture an excess of isocyanato groups over hydroxyl groups.

The novel elastic films and fibers of the invention comprise polymers that have a repeating unit that can be represented by Formula II:

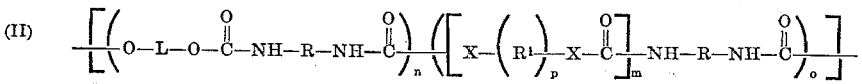

(a) wherein L has the significance discussed above with respect to Formula I, (b) wherein R represents a divalent organic group derived from an organic diisoyanate of the formula OCN—R—NCO, (c) wherein $n$ represents a number having a value of at least 1, for instance, up to 2 or more, (d) wherein $m$ represents an integer having a value of 0 to 1, (e) wherein X represents —O—, —NR$^6$— wherin R$^6$ is hydrogen or alkyl of up to, for instance, 4 carbon atoms and preferably 1 carbon atom, and —NR$^7$— wherein two R$^7$ variables are taken together to form alkylene, (f) wherein R$^1$ represents a divalent organic group such as alkylene, phenylene, cycloalkylene, alkylphenylene, bis(alkylene) carbonate, arylene, alkarylene, aralkylene, and the like, that is derived from a difunctional curing compound of the formula HX—(R$^1$)$_p$XH having up to, for example 15 carbon atoms, (g) wherein $p$ is an integer having a value of 0 or 1 provided that when $p$ is 0 X represents —NR$^6$—; and (h) wherein $o$ represents a number having a value of at least 1, for instance, up to 2 or more.

In producing the elastic films and fibers of the invention, there are employed the above-mentioned three broad classes of compositions, i.e., the hydroxyl-terminated organic polymer HO—L—OH, organic diisocyanate, and curing compound. These three classes of compositions will be discussed in turn, starting immediately below.

(A) The hydroxyl-terminated, organic polymer

HO—LOH

In a first desirable embodiment of the invention, the hydroxyl-terminated organic polymer HO—L—OH comprises a linear polymer that has at least two segments each of which contains a plurality of carbonylpentamethyleneoxy units, with the said segments being interconnected with the residue of an organic diisocyanate. In accordance with this embodiment of the invention, the hydroxyl-terminated organic polymer HO—L—OH can be prepared in a two-step process that comprises the steps of: (a) reacting epsilon-caprolactone with a bifunctional initiator to produce a hydroxyl-terminated, substantially linear epsilon-caprolactone polymer; and (b) reacting a stoichiometric excess of said epsilon-caprolactone polymer with an organic diisocyanate to produce the hydroxyl-terminated organic polymer HO—L—OH.

The substantially linear, hydroxyl-terminated epsilon-caprolactone polymer of Step (a) can be produced by known methods. For example, epsilon-caprolactone can be reacted with a bifunctional initiator as disclosed in U.S. Patents 2,878,236; 2,890,208; and 2,914,556. The epsilon-caprolactone is reacted with a bifunctional initiator, preferably a diol, a diamine, or an aminoalcohol, preferably in the presence of a catalyst which can be an acid, an organic tin compound, a metal chelate, a metal acylate, or the like. Useful bifunctional initiators are compounds which contain two, and only two groups which contain reactive hydrogen such as hydroxyl, primary and secondary amino, amido, sulfamyl, oximido and the like.

Specific illustrative compositions which can be employed to catalyze the reaction of epsilon-caprolactone with bifunctional initiator include triethanolamine titanate, triethanolamine titanate - N - oleate, hydroxytitanium oleate, isopropoxytitanium oleate, octylene glycol titanate, tetraisopropyl titanate, dibutyltin dilaurate, dibutyltin diacetate, dioctyltin oxide, dilauryltin oxide, tetraphenyltin, dibutyltin dichloride, tributyltin acetate, sulfuric acid, phosphoric acid, hydrogen chloride, boron trifluoride, zinc chloride, aluminum trichloride, tin dichloride, tin tetrachloride, acetic acid, acetic anhydride, 2-ethylhexanoic acid, benxoic acid, benzoyl chloride, stannous octoate, stannous oleate, and many other materials.

One desirable class of bifunctional initiators are the aliphatic and cycloaliphatic diols such as ethylene glycol, propylene glycol, 1,3-dihydroxypropane, 2,2-dimethyl-1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6- and 1,8-dihydroxyoctane, 1,10-dihydroxydecane, dihydroxycyclohexanes, and alkylene oxide adducts of the above-described aliphatic diols particularly where the alkylene oxide has from 2 to 4 carbon atoms. Also useful as bifunctional initiators are dihydric phenols such as resorcinol, hydroquinone, 2,2-bis-(para-hydroxyphenyl) propane, bis(para-hydroxyphenyl)methane, various phenylenedialkanols, 1,4-piperazinediethanol, and others. Compounds having both aromatic and aliphatic hydroxyls such as hydroxymethylphenol are also useful as bifunctional initiators.

The alkylene glycols and the dialkylene glycols wherein the alkylene moieties have from 2 to 4 carbon atoms are preferred diol bifunctional initiators.

Another useful class of bifunctional initiators includes the aminoalcohols. Illustrative of these compounds are alkanolamines such as ethanolamine, isopropanolamine, butanolamine, N-alkyldialkanolamines such as N-methyldiethanolamine, N - ethyldipropanolamine, N - butyldibutanolamine, and other compounds such as N-phenyldiethanolamine, p-aminophenol, N-phenyldiisopropanolamine, N-tolyldibutanolamine, and the like.

Other useful bifunctional initiators include the diamines, for example, alkylene diamines such as ethylene diamine, propylene diamine, 1,3-butanediamine, and the like; aromatic diamines such as meta-phenylenediamine, 2,4- and 2,6-diaminotoluene, 1,5-naphthalenediamine, benzidine, 4,4'-methylenedianiline, and the like; cycloaliphatic diamines such as 1,4-cyclohexanediamine and others; heterocyclic amines such as piperazine, 2,5-dimethylpiperazine, 1,4-bis(3-aminopropyl)-piperazine, and the like; as well as many other amines such as bis(2-aminoethyl) carbonate, bis(2-aminopropyl) carbonate and bis(2-aminoethyl) adipate. One or both of the amino groups can be a secondary amino group, prefreably wherein one of the groups attached to nitrogen is lowed alkyl (i.e., having up to about 4 carbon atoms).

Other bifunctional initiators that can be used to prepare the hydroxyl-terminated, epsilon-caprolactone polymer of Step (a) are listed in U.S. Patent 2,933,477 as well as in the three patents referred to above (i.e., 2,878,-236; 2,890,208; and 2,914,556).

The most useful bifunctional initiators are those compounds that have up to 20 carbon atoms and that have two reactive groups wherein the groups are either alcoholic hydroxyl, phenolic hydroxyl, primary amino, secondary amino, or a mixture of two of the above. Preferably, the initiator is free of ethylenic and acetylenic unsaturation and is free of nonhydrocarbon moieties (other than the 2 reactive groups) except for ether oxygen, tertiary amino, carbonate, carbonyloxy, and the like.

The above-described epsilon-caprolactone polymer can be represented in simplification by Formula III:

III

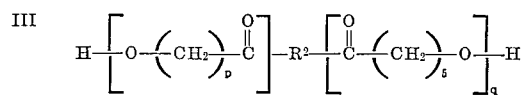

wherein $p$ plus $q$ is a number having a value of at least 1 and preferably greater than 1, and wherein $R^2$ represents the residue after removal of two terminal reactive hydrogens of the bifunctional initiator. Since the bifunctional initiators are preferably those wherein the two reactive groups are hydroxyl or amino, the connecting groups between the bifunctional initiator and the epsilon-caprolactone residues will in these cases be ester or amide groups. The $R^2$ variable preferably has no more than 20 carbon atoms.

Epislon-caprolactone has a tendency to form small quantities of peroxides, acids and other impurities upon standing. These impurities cause poor color which is obviously undesirable, for example, in a fiber that is to be used for clothing, etc. The formation of color-forming impurities can be suppressed by adding a stabilizer to freshly distilled or freshly prepared epsilon-caprolactone. Such stabilizers includes the triorgano phosphites such as tridecyl phosphite, trihexyl phosphite, tributyl phosphite, diphenyldecyl phosphite, and other trihydrocarbyl phosphites. Tridecyl phosphite is preferred. There can be employed in conjunction with the phosphite an alkylphenol such as 2,6-di-tertiary-butyl-para-cresol, monomethyl ether of hydroquinone, or the like. The stabilizer or stabilizers are used in small amounts, for example, from 20 to 1000 parts per million, based upon weight of epsilon-caprolactone. It is highly preferred that the epsilon-caprolactone that is employed in the invention be stabilized to prevent color formation.

In Step (b), the hydroxyl-terminated, substantially linear, epsilon-caprolactone polymer is reacted with less than stoichiometric quantities of an organic diisocyanate. Among the organic diisocyanates that can be employed there can be mentioned the aromatic diisocyanates such as 2,4- and 2,6-tolylene diisocyanate, 1,3-diisocyanatobenzene, 2,4- and 2,6-anisole diisocyanate, 4,4'- and 2,4'-diisocyanatodiphenylmethane, naphthalene diisocyanate, and the like; aliphatic diisocyanates such as hexamethylene diisocyanate, 1,4-diisocyanatobutane, diisocyanatocyclohexanes, and the like; and diisocyanates of mixed aromatic/aliphatic character such as xylene diisocyanates, especially the meta-isomer, i.e., 1,3-bis(isocyanatomethyl) benzene, and the like. Additional diisocyanates that can be employed are disclosed in an article by Siefken, Annalen 562, pages 122-135 (1949).

In general, the preferred diisocyanates are those that contain not more than 20 carbon atoms and which are composed of carbon, hydrogen and oxygen (except for the isocyanato groups). The aromatic diisocyanates are preferred, and the meta-arylene diisocyanates are more preferred. 2,4- and 2,6-tolylene diisocyanate is most preferred.

In the reaction of the epsilon-caprolactone polymer with one or more organic diisocyanates in Step (b), it is preferred to add the diisocyanate to the epsilon-caprolactone polymer in order to maintain an excess of hydroxyl groups. The temperature of the reaction between the polymer and the diisocyanate is not narrowly critical, and can vary from, for example, about 25° C. to about 120° C. and preferably from about 75° C. to about 110° C. The reaction time is dependent upon various factors, such as temperature, nature of reactants, presence or absence of catalysts, and the like, and can vary over a wide range. For instance, a reaction time in the range of from 0.5 hour to 5 hours is suitable. The reaction is preferably carried out in the undiluted state, although inert solvents can be used if desired. Conventional isocyanate/hydroxyl catalysts can be used if desired. Examples include stannous octoate, dibutyltin dilaurate, and the like. The catalyst is used in small amounts, e.g., from 0.05 to 2.0 weight percent, based on weight of diisocyanate plus diol.

The epsilon-caprolactone polymer and the organic diisocyanate are reacted in such proportion that the resulting polymer has hydroxyl end groups. For instance, useful molar ratios of epsilon-caprolactone polymer, organic diisocyanate have been found in the range of from 2:1 to 5:4, inclusive, and preferably from 2:1 to 3:2, inclusive. The product of Step (b) is a substantially linear, hydroxyl-terminated organic polymer having segments that contain a plurality of carbonylpentamethyleneoxy units interconnected through urethane groups by residues of organic diisocyanates, and is a preferred embodiment of the hydroxyl-terminated organic polymer

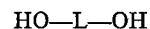

As was indicated above with respect to Formula I, in certain preferred embodiments of the invention the divalent group L in the polymer HO—L—OH contains at least about 5 mole percent of a divalent organic group that contains a non-reactive pendant substituent group, or which is unsymmetrical, or both. In the case of the first desirable embodiment of the invention described immediately above (wherein the polymer HO—L—OH is prepared by extending a linear caprolactone polymer with oragnic diisocyanate), the said divalent organic group that contains a pendant substiutent group and/or is unsymmetrical can be the residue of the bifunctional initiator (i.e., the compound used as the starter for the epsilon-caprolactone polymer) or the residue of the oragnic diisocyanate. Among the bifunctional initiators that have pendant substituent groups that can be employed in this connection there can be mentioned 1,2-propylene glycol, dipropylene glycol and higher polypropylene glycols, 2,2-dimethyl-1,3-propanediol, isopropanolamine, N-phenyldiethanolamine, and the like. 1,3-dihydroxycyclohexane, resorcinol, and meta-diaminobenezne are examples of useful bifunctional initiators that are unsymmetrical. 2,4- and 2,6-diaminotoluene is an excellent example of a bifunctional initiator that is both unsymmetrical and contains a pendant substituent group.

Illustrative examples of organic diisocyanates that are either unsymmetrical or contain a pendant substituent group or both include 2,4- and 2,6-tolylene diisocyanate, 1,3-diisocyanatobenzene, 2,4- and 2,6-anisole diisocyanate, meta-xylene diisocyanate, 2,4'-diisocyanatodiphenylmethane, 1,3 - diisocyanatocylohexane, 3 - methoxyhexanediisocyanate, and the like.

In a second desirable embodiment of the invention, the carbonylpentamethyleneoxy units of the group L are interconnected by substituted-carbonylpolymethyleneoxy units, i.e., by the residues of substituted lactones.

In this desirable embodiment of the invention, the hydroxyl-terminated organic polymer HO—L—OH is produced by reacting a mixture of epsilon-caprolactone and one or more substituted lactones with a bifunctional initiator, preferably in the presence of a catalyst. The above-mentioned mixture contains at least about 50 mole percent of epsilon-caprolactone. The reaction conditions and the bifunctional initiators that can be employed were described above with respect to Step (a) of the first desirable embodiment of the invention.

Among the various substituted lactones that can be employed there can be mentioned methyl-epsilon-caprolactones such as beta-, delta-dimethyl-epsilon caprolactone, beta, gamma-dimethyl-epsilon-caprolactone, gamma, delta-dimethyl-epsilon-caprolactone, and the like, various ethyl-epsilon-caprolactones such as beta-ethyl-epsilon-caprolactone, chloromethyl-epsilon-caprolactones, alpha,alpha-dimethylpropiolactone, alpha,alpha-dichloromethyl-propiolactone, various alpha-chlorolactones such as alpha-chloro-epsilon-caprolactone, 10 - hydroxyundecanoic acid lactone, 3-oxo-6-hydroxyhexanoic acid lactone, epsilon-ethoxy-epsilon-caprolactone, and the like. Thus, the substituted lactones that can be employed include the mono-, di-, and tri-substituted propiolactones, caprolactones, zeta-enantholactones, and higher lactones. In general, the use of lactones having five- and six-numbered rings (i.e., gamma-butyrolactones and delta-valerolactones) is not preferred for the reason that such lactones are more stable in the monomeric form (i.e., as a 5- or 6-membered ring) than in the polymerized form. Such lactones can be employed, but the polymers formed therefrom tend to be thermally unstable.

In this desirable embodiment of the invention, the carbonylpentamethyleneoxy units in the group L will be interconnected with groups that can be represented by Formula IV:

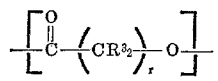

wherein $R^3$ represents hydrogen and at least one pendant substituent selected from the group consisting of alkyl, alkoxy, haloalkyl, alkoxyalkyl, or halo. Preferably, the substituent group contains not more than four carbon atoms. Methyl is the preferred alkyl group, and chloro is the preferred halo group. The variable $r$ represents a number having a value of at least 2 and up to 10 or more, and is preferably 2, 5 or 6. Generally, there will not be more than four pendant substituent groups, and it is preferred that there be not more than three pendant substituent groups. It is preferred that the omega carbon atom, i.e., the carbon that is bonded to the oxy atom, have at least one hydrogen directly bonded thereto.

The various substituted lactones mentioned above are known compositions. For instance, the preferred methyl-epsilon - caprolactones are described in U.S. Patent 2,878,236.

In a third desirable embodiment of the invention, the carbonylpentamethyleneoxy units in the hydroxyl-terminated organic polymer HO—L—OH are interconnected by the divalent residues of certain cyclic carbonates, hereinbelow described. In this embodiment of the invention, the polymer HO—L—OH can be produced by reacting a mixture of epsilon-caprolactone and one or more cyclic carbonates with a bifunctional initiator, said mixture containing at least about 50 mole percent of epsilon-caprolactone.

The mixture of epsilon-caprolactone and cyclic carbonate is reacted with a bifunctional initiator preferably in the presence of a catalyst such as an acid, an organotin compound, a metal chelate, a metal acylate, stannous octoate, or the like such as the catalysts disclosed in U.S. Patents 2,878,236; 2,890,208 and 2,914,556. The materials that can be employed as bifunctional initiators are discussed above, and the reaction conditions are substantially identical to those described for Step (a) above.

The cyclic carbonates contemplated are those which contain at least 6 atoms, preferably 6 atoms, in the ring nucleus that contains the carbonate group, that is, the

group. Among the cyclic carbonates that are particularly useful are those that can be represented by Formula V:

V 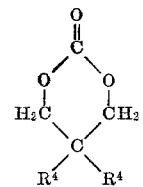

wherein each $R^4$ individually can be hydrocarbyl such as alkyl, cycloalkyl, aryl, alkaryl, aralkyl, and the like; hydrocarbyloxymethyl such as alkoxymethyl, cycloalkoxymethyl, aryloxymethyl, aralkyloxymethl, alkaryloxymethyl, and the like; acyloxymethyl such as alkanoyloxymethyl, arylcarbonyloxymethyl, and the like; nitro ($—NO_2$); dihydrocarbylamino such as dialkylamino, diarylamino, and the like; cyanoalkyl, cyanolkoxymethyl, and many other substituent groups. It is in general preferred that the $R^4$ variables individually contain no more than 18 carbon atoms, and that said variables be free of ethylenic and acetylenic unsaturation. Specific illustrative $R^4$ variables include methyl, ethyl, n-propyl, isopropyl, n-butyl, sec-butyl, t-butyl, isobutyl, pentyl, n-hexyl, 2-ethylhexyl, decyl dodecyl, stearyl, and other alkyl; cycloalkyl such as cyclopentyl, cyclohexyl, cycloheptyl, and the like; aryl such as phenyl, naphthyl, biphenylyl, and the like; aralkyl such as benzyl, phenethyl, phenylbutyl, and the like; alkaryl such as tolyl, xylyl, ethylphenyl, butylphenyl, octylphenyl, dodecyphenyl, and the like; hydrocarbylamino such as dimethylamino, diethylamino, dipropylamino, diisopropylamino, dibutylamino, di(2-ethylhexyl)- amino, distearylamino, and other dialkylamino; dicyclohexylamino, diphenylamino, cyanomethyl, cyanomethoxymethyl, and the like.

Specific illustrative cyclic carbonates, that are useful include 4,4-dimethyl-2,6-dioxacyclohexanone,
4-butyl-4-ethyl-2,6-dioxacyclohexanone,
4,4-diethyl-2,6-dioxacyclohexanone,
4-methyl-4-propyl-2,6-dioxacyclohexanone,
4,4-dioctyl-2,6-dioxacyclohexanone,
4-methyl-4-cyclohexyl-2,6-dioxacyclohexanone,
4,4-diphenyl-2,6-dioxacyclohexanone,
4-methyl-4-naphthyl-2,6-dioxacyclohexanone,
4,4-ditolyl-2,6-dioxacyclohexanone,
4,4-dibenzyl-2,6-dioxacyclohexanone,
4,4-dimethoxymethyl-2,6-dioxacyclohexanone,
4,4-diethoxymethyl-2,6-dioxacyclohexanone,
4,4-diphenoxymethyl-2,6-dioxacyclohexanone,
4-methyl-4-ethoxymethyl-2,6-dioxacyclohexanone,
4,4-dibenzoxymethyl-2,6-dioxacyclohexanone,
4,4-ditolyloxymethyl-2,6-dioxacyclohexanone,
4-methyl-4-acetoxymethyl-2,6-dioxacyclohexanone,
4-methyl-4-benzoyloxymethyl-2,6-dioxacyclohexanone,
4,4-diacetoxymethyl-2,6-dioxacyclohexane,
4-nitro-4-methoxymethyl-2,6-dioxacyclohexanone,
4-nitro-4-phenoxymethyl-2,6-dioxacyclohexanone,
4-nitro-4-acetoxymethyl-2,6-dioxacyclohexanone,
4-methyl-4-nitro-2,6-dioxacyclohexanone,
4-nitro-4-benzoylmethyl-2,6-dioxacyclohexanone,
4-dimethylamino-4-acetoxymethyl-2,6-dioxacyclohexanone, 4,4-dicyanomethyl-2,6-dioxacyclohexanone,
4,4-dicyanomethoxymethyl-2,6-dioxacyclohexanone,
and the like.

For economic purposes, the most commercially attractive of the cyclic carbonates is 4,4'-dimethyl-2,6-dioxacyclohexanone.

Exemplary methods of preparation of the various cyclic carbonates are described below.

The preparation of 4-nitro-4-hydrocarbyloxymethyl-2,6-dioxacyclohexanone or 4-nitro-4-acyloxymethyl-2,6-dioxacyclohexanone, etc., is effected by the following sequence of steps:

(1) 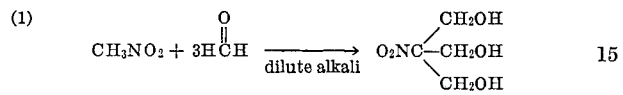

Equation 1 supra represents an aldol-like condensation reaction which can be conducted in the presence of a basic catalyst, e.g., a dilute alkali metal hydroxide solution, at a moderately elevated temperature. The product, i.e., tris(hydroxymethyl)nitromethane, is then contacted with a hydrocarbyl halide or an acyl halide which is designated as R"X in Equation 2 below:

(2) 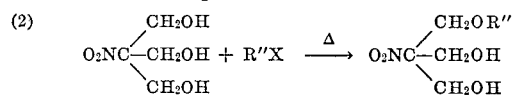

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

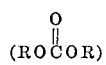
(ROCOR)

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals; the titanates having the general formulae $Y_2TiO_3$ and $Y_4TiO_4$ in which the Y's are alkyl, aryl, or aralkyl radicals. The tin compounds, the organic salts of leads, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3) 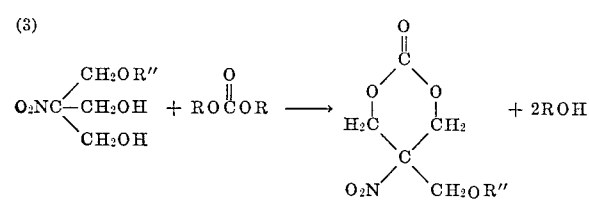

The R" radical in Equation 3 above is hydrocarbyl or acyl.

The preparation of 4-tertiary amino-4-hydrocarbyloxymethyl-2,6-dioxacyclohexanone or 4-tertiary amino-4-acyloxymethyl-2,6-dioxacyclohexanone can be accomplished by contacting the monoetherified product or monoesterified product of Equation 2 supra with hydrogen, in the presence of conventional hydrogenation catalysts, e.g., Raney nickel, platinum, and the like, at an elevated temperature, followed by alkylation of the resulting primary amine group (—$NH_2$) with, for example, a stoichiometric quantity of a hydrocarbyl halide, preferably in the presence of a base, e.g., an alkali metal hydroxide, to thus convert said —$NO_2$ group to a tertiary amine group, i.e., (4) 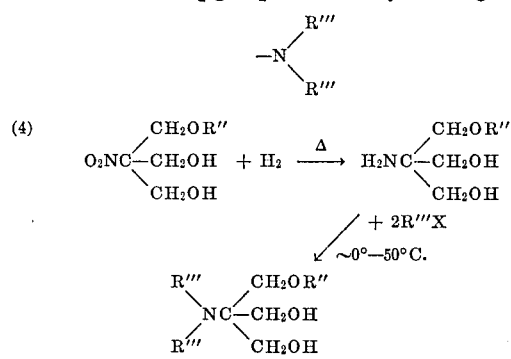

The resulting tertiary amino compounds are readily cyclized to the corresponding carbonates by following the procedure shown in Equation 3 supra.

The 4-nitro-4-hydrocarbyl-2,6-dioxacyclohexanones and 4-t-amino-4-hydrocarbyl-2,6-dioxacyclohexanones, can be prepared by the reaction of a hydrocarbyl substituted nitromethane, i.e., $RCH_2NO_2$ wherein R is an alkyl, aryl, cycloalkyl, aralkyl, alkaryl, alkenyl, cycloalkenyl, etc., with an excess of formaldehyde as shown in the following equation:

(5) 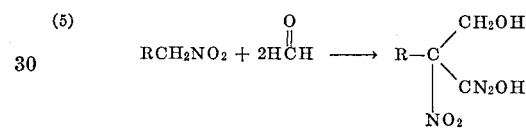

The resulting 2-nitro-2-hydrocarbyl-1,3-propanediol compound in Equation 5 then can be subjected to the cyclization step illustrated in Equation 3 supra, or it can undergo the sequence of steps illustrated in Equation 4, thus producing the corresponding various nitro and tertiary amino substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 6 depicts the over-all reaction:

(6) 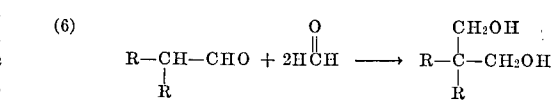

Both R's in Equation 6 represent hydrocarbyl groups. The resulting 2,2-di(hydrocarbyl)-1,3-propanediol then can be subjected to the cyclization step discussed in Equation 3 to yield 4,4-di(hydrocarbyl)-2,6-dioxyacyclohexanone.

The preparation of 4-hydrocarbyl-4-hydrocarbyloxymethyl-2,6-dioxyacyclohexanone or 4-hydrocarbyl-4-acyloxymethyl-2,6-dioxacyclohexanone is conveniently prepared by employing an aldehyde which contains two alpha hydrogen atoms in Equation 6 supra, that is:

(7) 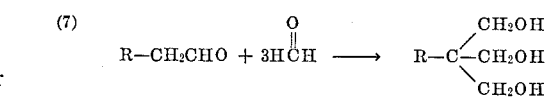

The resulting 1-hydrocarbyl-1,1,1-trimethylolmethane then can be reacted with R"X of Equation 2 supra, followed by the cyclization step of Equation 3 to obtain the cyclic carbonate under consideration.

The 4,4-di(hydrocarbyloxymethyl) - 2,6 - dioxyocyclohexanones or 4,4-di(acyloxymethyl)-2,6-dioxacyclohexanones are prepared by the reaction of pentaerythritol with sufficient R"X (note Equation 2) to produce the diether or diester of pentaerythritol which, in turn, can be cyclized (note Equation 3) to yield the corresponding carbonates. Equation 8 below illustrates the over-all reactions.

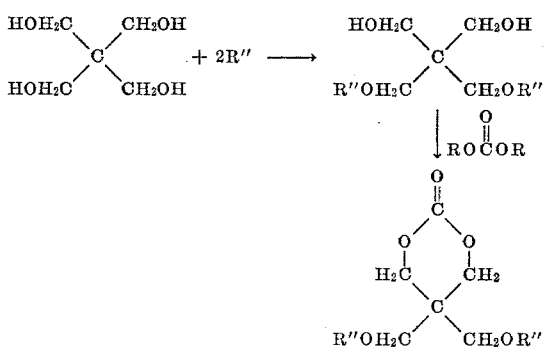

In the third embodiment of the invention, the hydroxyl-terminated organic polymer HO—L—OH will contain (in addition to the carbonylpentamethyleneoxy units) the recurring unit:

VI
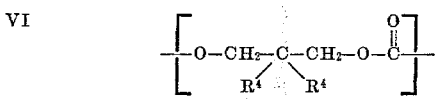

wherein the $R^4$ variables are as designated above with respect to Formula V.

In a fourth desirable embodiment of the invention the L group in HO—L—OH can contain oxy-1,2-propylene groups. This embodiment can be prepared in several ways. For example, a mixture of epsilon-caprolactone and propylene oxide can be reacted with a bifunctional initiator to form the hydroxyl-terminated, organic polymer

HO—L—OH

The bifunctional initiators and the catalysts and reaction conditions that can be employed for this polymerization were described above with respect to Step (a) in the first useful embodiment of the invention. Alternatively, polypropylene glycol can be employed as the bifunctional initiator. Other alkylene oxides and polyalkylene glycols can be used in lieu of or in conjunction with the propylene oxide, but are less preferred for economic reasons. Such other alkylene oxides include isobutylene oxide, 1,2-butylene oxide and 2,3-butylene oxide.

It is of course within the scope of the invention to combine any or all of the embodiments described above. For instance, the polymer HO—L—OH can be produced by first reacting a mixture of epsilon-caprolactone and 4,4-dimethyl-2,6-dioxacyclohexanone with a bifunctional initiator such as diethylene glycol, and secondly by extending the thus-formed copolymer by reacting with a stoichiometric deficiency or an organic diisocyanate such as 2,4- and 2,6-tolylene diisocyanate or meta-xylylene diisocyanate. A similar procedure can be employed with a polymer of epsilon-caprolactone and substituted lactone such as methyl-epsilon-caprolacone, or with a polymer of epsilon-caprolactone and propylene oxide.

The discussion above has been directed to describing the various modifications of the segment —L— in the polymer HO—L—OH. It has been seen that —L— contains at least about 50 mole percent of carbonylpentamethyleneoxy units. In a preferred embodiment, —L— also contains at least about 5 mol percent of one or more divalent organic groups that contain pendant substituents that are non-reactive with isocyanate, or are unsymmetrical, or both. In most cases, the linear chain or backbone of the divalent segment —L— will be composed of divalent hydrocarbon groups and/or divalent, substituted hydrocarbon groups, interconnected by one or more of the following divalent groups: ether oxygen (—O—),

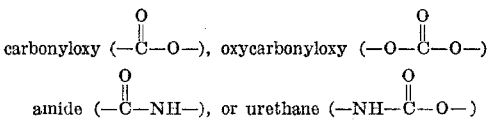

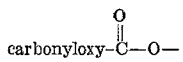

The substituent groups that are pendant to the polymer chain have been described above, and illustrative of such pendant groups are alkyl, alkoxy, aryl, alkaryl, aralkyl, cycloalkyl, alkoxyalkyl such as alkoxymethyl, cycloalkoxymethyl, aryloxymethyl, aralkoxymethyl, alkaryloxymethyl, alkanoyloxymethyl, arylcarbonyloxymethyl, nitro, dialkylamino, diarylamino, cyanoalkyl, cyanoalkoxymethyl, and the like. Generally, the pendant substituent group will have not more than 18 carbon atoms and preferably up to 10 and most preferably up to 4 carbon atoms, will be free of ethylenic and acetylenic unsaturation, and will contain no non-hydrocarbon moieties other than etheric oxygen —O—, carbonyloxy-$\overset{\overset{O}{\|}}{C}$—O— nitro, cyano, halo and tertiary amino. The preferred pendant group is alkyl, and methyl is more preferred. The pendant substituent group is of course, non-reactive with isocyanate.

The unsymmetrical divalent residues are unsymmetrical in the sense that the two valence bonds that connect said residues in the —L— molecular chain are not at opposite ends of the said residue. To illustrate, a 1,2-phenylene

or a 1,3-phenylene

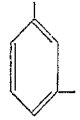

is unsymmetrical in the sense intended here, while a 1,4-phenylene

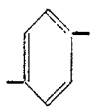

is symmetrical. The same is true for cyclohexylene and for multi-ring structures. For instance, 4,4'-diphenylmethane structures are symmetrical, while 2,3'- and 2,4'-diphenylmethane structures are unsymmetrical.

The proportion of carbonylpentamethyleneoxy in the —L— moiety is an important feature of the invention. For example, useful films and fibers can be produced from polymers wherein the —L— moiety contains at least 50 mole percent and up to 95 mole percent of carbonylpentamethyleneoxy. In some cases, it is desirable that the —L— moiety contain from 60 to 90 mole percent carbonylpentamethyleneoxy. In a preferred embodiment, the —L— moiety contains from 60 mole percent to 85 mole percent of carbonylpentamethyleneoxy, and more preferably, from 70 mole percent to 80 mole percent of carbonylpentamethyleneoxy.

The molecular weight of the polymer HO—L—OH is likewise an important feature of the invention. The molecular weight of HO—L—OH is greater than about 700, preferably greater than about 1500 up to, for example, about 5000 or more, more preferably from about 1700 to about 3500, and most preferably from about 2000 to about 3200. The exact molecular weight that is selected will be dependent in part upon the nature of the hydroxyl-terminated organic polymer HO—L—OH. For example, in the case of the first desirable embodiment of the invention wherein epsilon-caprolactone is reacted with a bifunctional initiator to produce a hydroxyl-terminated polymer which is then extended by reaction with an organic diisocyanate (e.g., 2,4- and 2,6-tolylene diisocyanate), the molecular weight of the initial polymer produced by reaction of epsilon-caprolactone with the initiator is desirably in the range of from about 500 to about 1500 as determined by hydroxyl number analysis. When this initial polymer is extended with organic diisocyanate a preferred embodiment of the invention is obtained wherein the extended diol (i.e., HO—L—OH) has a molecular weight in the range of from about 2000 to about 3500, and more preferably, about 2500 to about 3200. In another desirable embodiment of the invention wherein the polymer HO—L—OH is produced by reacting a mixture of epsilon-caprolactone and substituted lactone with a bifunctional initiator, it is preferred that HO—L—OH have a molecular weight of greater than about 1000, more preferably from about 1500 to about 3500, and most preferably from about 2000 to about 3400.

In certain embodiments of the invention, for example in the production of many elastic fibers, it is desirable that the hydroxyl-terminated organic polymer

HO—L—OH have a Poisson molecular weight distribution. A Poisson molecular weight distribution occurs when the following conditions are met:

(1) Growth of each polymer molecule must proceed exclusively by consecutive addition of monomers to an active terminal group.

(2) All active termini, one for each molecule, must be equally capable of reaction with monomer and this condition must prevail throughout the polymerization.

(3) All active centers must be introduced at the outset of the polymerization and there must be no chain transfer.

The distribution is described by the equation $$W_x = [v/(v+1)]xe^{-v}v^{x-2}/(x-1)!$$

where $W_x$=the weight fraction of degree of polymerization $x$, and $v$=the number of monomer units per molecule.

A full discussion of Poisson molecular weight distribution is found in the text "Principles of Polymer Chemistry" by Paul J. Flory, Cornell University Press, Ithaca, New York (1953). The pertinent section of Flory's text is found in chapter VIII.

The elastic films and fibers of the invention are produced by reacting the above-described hydroxyl-terminated organic polymer HO—L—OH with a stoichiometric excess of an organic diisocyanate to form an isocyanato-terminated prepolymer which is then cured by reacting with a curing compound that contains two, and only two, groups that contain reactive or labile hydrogen.

(B) The organic diisocyanate

In the reaction of the polymer HO—L—OH with an organic diisocyanate, the diisocyanate is employed in stoichiometric excess, for example, from about 1.5 to about 3 moles of organic diisocyanate per mole of polymer HO—L—OH. Preferred proportions are from about 1.5 to about 2.5, and more preferably from about 1.8 to about 2.3 moles of organic diisocyanate per mole of polymer HO—L—OH. In many cases it is desirable to employ about two moles of organic diisocyanate per mole of polymer HO—L—OH.

Many organic diisocyanates can be employed to produce the prepolymer. For instance, there can be mentioned bis(4-isocyanatophenyl)methane, 1,5-naphthalene diisocyanate, 2,4- and 2,6-tolylene diisocyanate, xylylene diisocyanates, and other diisocyanates having up to 20 carbon atoms. The preferred organic diisocyanates are the symmetrical or para-positioned arylene diisocyanates such as bis(4-isocyanatophenyl)methane. Also deserving of particular mention is para-xylylene diisocyanate.

The temperature used in the reaction of the polymer HO—L—OH with organic diisocyanate to produce the prepolymer is not narowly critical. For example, reaction temperatures of from about 25° C. to about 120° C., and preferably from about 50° C. to about 100° C. have been found useful. In carrying out this reaction, it is generally preferred to add the polymer to the organic diisocyanate. The reverse procedure can be used if desired, but it is recommended that reaction mixtures containing an excess of or an equivalent amount of hydroxyl groups not be maintained for a significant period of time (e.g., not longer than about 10 or 15 minutes). The reaction time can vary over a wide range, for instance, from 0.5 hour to 3 hours or more. The reaction can be conducted undiluted or in an inert reaction vehicle, whichever is desired. A catalyst such as stannous octoate, dibutyltin dilaurate, or the like, can be employed in the production of the prepolymer, if desired. The catalyst is used in catalytic amounts, such as from 0.05 to 1.5 weight percent, based on weight of the polymer HO—L—OH.

(C) The curing compound

In the next step, the above-described prepolymer is reacted with a difunctional curing compound having 2 (and only 2) reactive groups, i.e., 2 groups reactive with isocyanate. Examples of such curing compounds include diamines, diols, aminoalcohols, hydrazine, water, and the like. It is prefered that said curing compound have 2 reactive groups selected from the group consisting of alcoholic hydroxyl, primary amino and secondary amino. The most preferred reactive groups are amino, particularly primary amino.

Among the reactive diamines that can be employed are such compounds as ethylenediamine, 1,2- and 1,3-propylenediamine, N - methyl - bis(aminopropyl)amine, tetramethylenediamine, pentamethylenediamine, hexamethylenediamine, cyclohexylenediamines, 1,4-cyclohexane-bis(methylamine), bis(2-aminoethyl) carbonate, and other alkylene, cycloalkylene, and carbonate diamines having up to, for instance, 10 carbon atoms. Reactive arylene diamines are also useful, for example, phenylene diamines, tolylenediamines, 4,4'-diaminodiphenylmethane, m- and p-xylylenediamine, 3,3'-dichloro-4,4'-diaminophenylmethane, benzidine, 1,5-diaminonaphthalene, and other arylenediamines having up to, for example, 15 carbon atoms. Reactive heterocyclic diamines are also useful, for instance, piperazine, 1,4-bis(3 - aminopropyl)piperazine, trans-2,5-dimethylpiperazine, and the like. Many other reactive diamines can be used, for instance, xylylene diamine. It is preferred that the diamine contain no groups other than the two reactive amino groups that are reactive with isocyanato. The said diamine can have various substituent groups including chloro, bromo, fluoro, alkoxy, aryloxy, carbonyloxy, oxycarbonyloxy, sulfone, tertiary amino, and the like. Generally it is also preferred that the diamine have not more than 15 carbon atoms.

Various diols and aminoalcohols are also useful curing compounds. Among the diols there can be mentioned ethylene glycol, propylene glycol, 2,2-dimethyl-1,3-propanediol, para-dibenzyl alcohol, 1,4-butanediol, and the like. Useful aminoalcohols include ethanolamine, isopropanolamine, and the like. Water and hydrazine are also useful curing agents. The organic diamines are the preferred curing compounds, with the alkylenediamines being more preferred, and ethylenediamine being most preferred.

The ratio of reactants in the curing step can vary over a range of proportions of from about 0.9 to about 1.2 moles of prepolymer per mole of curing compound. In many cases it is desirable to employ about stoichiometric proportions of prepolymer and curing compound, i.e., in proportions such that there is present approximately one isocyanato group of the prepolymer per reactive group of the difunctional curing compound. In some cases, it may be desirable to employ a slight stoichiometric excess of the prepolymer. For instance, in the first described embodiment of the invention (wherein HO—L—OH is prepared by first reacting epsilon-caprolactone with a bifunctional initiator to form a diol which is then extended by reacting with a stoichiometric deficiency of an organic diisocyanate), it is desirable in some cases to employ at least about 1.05 moles of prepolymer per mole of curing compound, for instance, from about 1.05 to about 1.4 moles of prepolymer per mole of curing compound, in some cases, from about 1.08 to about 1.2 moles of prepolymer per mole of curing compound, and oftentimes from about 1.10 to about 1.12 moles of prepolymer per mole of curing compound.

A preferred method for carrying out the reaction of prepolymer with curing compound is to effect the reaction in a solvent and thus form a solution from which the elastic fibers and films of the invention can be produced by conventional solution spinning and casting techniques. This can be done by dissolving the prepolymer in a solvent to make a 5 to 40 weight percent solids solution (percent based on total solution weight), and then adding the curing compound to this solution. The addition will be facilitated if the curing compound is also dissolved in the same solvent. Many solvents can be used for this purpose. The essential requirement is that the solvent be non-reactive with the prepolymer and with the curing compound. Examples of useful solvents include dimethyl sulfoxide, N,N-dimethylformamide, N,N-dimethylacetamide, tetrahydrofuran, and the like. N,N-dimethylformamide is the preferred solvent.

The reaction between the prepolymer and the curing compound takes place readily at room temperature. Therefore, the solution can be spun into a fiber or cast into a film within a few minutes after the curing compound has been added. For example, the solution can usually be cast or spun within 10 minutes after the addition of a diamine to the prepolymer when the reactants are at a temperature of about 25° C. In making fibers, the polymer solution can be spun into a water bath by conventional techniques. Liquids other than water can be employed in the bath, if desired, but water is preferred for economic reasons. Ethylene glycol, glycerol, and the like are illustrative of such other liquids. The temperature of the bath can be varied over a range of, for instance, 25° C. to 90° C. The fiber is recovered from the bath by conventional techniques, and can be given a post-cure to enhance certain of the properties. A cure at elevated temperatures of up to 100° C. for up to 5 hours is useful in many cases. Preferred curing conditions are a bake at 90° C. to 100° C. for up to 4 hours. Conventional solution casting techniques can be employed in making films. The post-cure indicated above can also be used, if desired.

In order to prevent gelling during the reaction between the prepolymer and curing compound in a solvent, it is desirable to add a small amount of acid to the prepolymer solution before the curing compound is added. By so doing, the storage life of the solution containing the reaction product of prepolymer and curing compound is increased significantly, for example, from a storage life of in some cases only a few minutes without the acid to a storage life of up to about three weeks with the acid. The acid is used in small amounts, for instance, from about 0.005 weight percent to about 0.6 weight percent, based on the weight of the prepolymer. The preferred amount of acid is from 0.13 to 0.25 weight percent, based on the weight of prepolymer.

Laboratory tests have shown that the following acids and acid-forming compounds are useful for the purpose described in the preceding paragraph: phosphoric acid, phosphorous acid, hydrochloric acid, nitric acid, sulfuric acid, benzoyl chloride, benzene sulfonyl chloride, benzene sulfonic acid, dichloroacetic acid, octylphenyl acid phosphate, stearyl acid phosphate, and boron trifluoride-etherate. Phosphoric acid is preferred. It is noted that the $pK_A'$ of each of the above-mentioned acids is less than about 2.5. (The term $pK_A'$ refers to the negative of the $log_{10}$ of the hydrogen ion ionization constant in aqueous solution.)

The elastic lactone polymers of the invention are highly useful compositions. For instance, in the form of fibers, the polymers can be used to make foundation garments, bathing suits, sporting clothes, elastic waist bands, hose, and the like. In the form of films, the polymers can be employed as elastic sheeting, as "rubber bands," and the like.

The examples which follow illustrate certain aspects of the invention.

EXAMPLE 1

To a stainless steel reactor equipped with a stirrer there were added 3180 grams (30 moles) of diethylene glycol and 0.24 gram of tetraisopropyl titanate. The reaction mixture was then heated to 175° C., and 21,330 grams (187.5 moles) of epsilon-caprolactone was then added. The temperature was maintained at 175° C. until a refractive index of 1.4615 was obtained. The mixture was cooled to 100° C. and 3480 grams (20 moles) of tolylene diisocyanate was added. The mixture was stirred at 100° C. for 6 hours to produce a diol having a hydroxyl number of 39.4 and an acid number of 0.05. This diol is a preferred embodiment of the organic polymer HO—L—OH.

A mixture of 114 grams (0.04 mole) of the above-described diol containing 100 parts per million of phosphoric acid and 20 grams (0.08 mole) of bis(4-isocyanatophenyl)methane was reacted at 85° C. for 2 hours and then cooled to 40° C. N,N-dimethylformamide (665 grams) was added to the prepolymer and the mixture was stirred until all the solid had dissolved. Phosphoric acid (2870 parts per million, based on weight of the prepolymer) was added to the solution. Ethylene diamine (2.16 grams; 0.036 mole) dissolved in 96 grams of N,N-dimethylformamide was then added to the mixture over a 5 minute period. This solution was then spun into a water bath and the fiber was cured at 100° C. for 16 hours.

The properties of the above-described fiber were compared with the properties of a commercial polyurethane elastomeric fiber prepared from polytetramethylene glycol and bis(isocyanatophenyl)methane and cured with hydrazine. The properties of these two fibers are displayed in Table I, below.

TABLE I.—PROPERTIES OF ELASTOMERIC FIBERS

| | Epsilon-Caprolactone-Based Fiber of Example 1 | Commercial Product |
|---|---|---|
| Tenacity, grams/denier | 0.836 | 0.73 |
| Ultimate elongation, percent | 605 | 681 |
| Stress, grams/denier at 300 percent elongation | 0.125 | |
| Tension set after 10 minutes | 11 | 17 |

It is noted that the elastic fibers of the invention have a higher tenacity (i.e., tensile strength) and lower tension set than the commercial product which heretofore has been the most widely used of the elastic fibers on the market.

The elastic films and fibers of the invention desirably have a tension set of less than about 40 percent, preferably less than 30 percent, and more preferably less than about 20 percent. Tension set is determined by the following procedure:

The film or fiber is stretched to 400 percent of its original length and is held at this length for 16 hours at room temperature (i.e., about 21° C.) The tension is then released, and the distance between gauge marks on the specimen is measured after 10 minutes. The tension set is the percentage increase in distance between the gauge marks (referred to the original distance before straining).

The use of an epsilon-caprolactone polymer in the elastic compositions of the invention results in many advantages. One such advantage is that polymers that are produced by reacting epsilon-caprolactone or a mixture of same and substituted lactone, alkylene oxide, or cyclic carbonate with a bifunctional initiator have a relatively narrow and reproducible molecular weight distribution. This permits careful control to be made over the ultimate properties of the elastic materials that are made from such epsilon-caprolactone polymers. In contrast, polymers that are made by esterification reactions (i.e., hydroxyl with carboxyl to produce an ester group plus water) have a much wider molecular weight distribution due in part to the more severe reaction conditions which leads to side reactions such as ester interchange reactions, and also due in part to the nature of the polymerization which leads to the "most probable" molecular weight distribution rather than a Poisson distribution. (Cf.—see the Flory text, cited above.) Thus, products made from such polymers have a wider variation in ultimate properties. In the subject invention, the molecular weight distribution can be broadened, if desired, by adding the bifunctional initiator in increments duirng the lactone polymerization step.

Another advantage found when using epsilon-caprolactone polymers is surprisingly good hydrolytic stability when compared with polyesters prepared by reacting an excess of a dihydric alcohol with a dicarboxylic acid. This can be demonstrated by the following experiment wherein the hydrolytic stabilities of various hydroxyl-terminated polymers were compared:

Ten grams of polymer was added to 250 grams of distilled water containing phenolphthalein. Any free acid present was neutralized with 0.5 N sodium hydroxide. To this mixture, there was added one gram of sodium hydroxide and the mixture was then stirred at 60° C. under a nitrogen atmosphere. When the characteristic basic phenolphthalein color disappeared, the reaction was terminated. The time that is required to reach this end point is an indication of the stability of the polymer to alkaline hydrolysis.

The following polymers were subjected to the above-described test:

(A) Polyester of adipic acid and an 80/20 mixture of ethylene glycol and propylene glycol having a molecular weight of 1300.

(B) Polyester of adipic acid and diethylene glycol.

(C) Polyester of adipic acid and 1,4-butanediol having a molecular weight of 1300.

(D) Polymer of epsilon-caprolactone initiated with 1,3-propanediamine having a molecular weight of 2000.

(E) Polymer formed by reacting (a) two moles of an epsilon-caprolactone polymer initiated with diethylene glycol with (b) one mole of tolylene diisocyanate, having a molecular weight of 2000.

(F) Polymer of an 80/20 mixture of epsilon-caprolactone and methyl-epsilon-caprolactone initiated with diethylene glycol, said polymer having a molecular weight of 2000.

(G) Polymer of epsilon-caprolactone initiated with ethylene glycol, having a molecular weight of 2000.

The table below displays the time required to reach the end point in the test described above.

TABLE II

Hydrolytic stability

| Polymer: | Time to reach end point, hours |
|---|---|
| A | 0.33 |
| B | 15 |
| C | 64 |
| D | 132 |
| E | 200 |
| F | 252 |
| G | 384 |

The polymers produced from epsilon-caprolactone (D, E, F and G) are substantially more stable to hydrolysis than the polyesters identified above (i.e., A, B and C).

EXAMPLE 2

To a round-bottom three neck flask equipped with a condenser and stirrer there was added 3163 grams (27.8 moles) of epsilon-caprolactone, 231 grams (3.73 moles) of ethylene glycol and 0.02 gram of tetraisopropyl titanate. The reaction mixture was then heated at 175° C. until the refractive index became constant (refractive index at 50° C., 1.4605). The mixture was then cooled to 100° C. Tolylene diisocyanate (80% 2,4-isomer, 20% 2,6-isomer) 321 grams (1.845 moles) was then added at such a rate that the temperature did not exceed 105° C. After all the tolylene diisocyanate had been added, the mixture was stirred at 100° C. for 3 hours. The resulting hydroxyl-terminated organic polymer had a hydroxyl number of 57.19 and an acid number of 0.59. At this point, 115 parts per million, based on weight of the polymer, of phosphoric acid was added.

A mixture of 77.6 grams (0.04 mole) of the above polymer and 20 g. (0.08 mole) of 4,4'-diphenylmethane diisocyanate (MDI) was reacted at 85° C. for two hours and then cooled to 25° C. N,N - dimethylformamide (DMF) (490 cc.) was then added and the mixture stirred until all the solid had dissolved. At this point, 2360 parts per million of phosphoric acid (parts based on weight of the prepolymer) was added to the solution. Ethylenediamine (2.16 grams, 0.036 mole) dissolved in 100 cc. of DMF was then added to the flask. The solution was then cast onto glass plates and cured at 100° C. for 16 hours. The properties of the elastic film are shown below in Table III.

EXAMPLE 3

To a round-bottom three-neck flask equipped with a stirrer there was added 3501 g. (30.7 moles) of epsilon-caprolactone, 477 g. (7.7 moles) of diethylene glycol and 0.04 g. of tetraisopropyl titanate. The reaction mixture was then heated at 175° C. until the refractive index became constant. The mixture was then cooled to 100° C. Tolylene diisocyanate (80% 2,4-isomer, 20% 2,6-isomer) 522 grams (3.0 moles) was then added at such a rate that the temperature did not exceed 105° C. After all the tolylene diisocyanate had been added, the mixture was stirred at 100° C. for 3 hours. The resulting hydroxyl-terminated polymer had a hydroxyl number of 36.3. At this point, 78 p.p.m. (based on weight of polymer) of phosphoric acid was added.

A mixture of 123.6 grams (0.04 mole) of the above polymer and 20 grams (0.08 mole) of MDI was reacted at 85° C. for two hours and then cooled to 25° C. Dimethylformamide (693 cc.) was then added and the mixture stirred until all the solid had dissolved. 2430 parts per million (based on weight of prepolymer) of phosphoric acid was added. Ethylenediamine (2.16 grams, 0.036 mole), dissolved in 100 cc. of DMF was then added to the mixture over a 5 minute period. The solution was then cast onto glass plates and cured at 100° C. for 16 hours. The properties of the elastic film are shown below in Table III.

EXAMPLE 4

This example illustrates the production of an elastic film based upon a polyester of a polyhydric alcohol and a polycarboxylic acid, in order to compare with the properties with the lactone-based elastic films of the invention.

To a round-bottom three-neck flask equipped with a steam condenser and stirrer there was added 440 grams (3.01 moles) of adipic acid, 242 grams (3.90 moles) of ethylene glycol and 0.05 gram of tetraisopropyl titanate. The reaction mixture was heated at 175° C. with steam, being passed through the condenser, until the acid number dropped below one. The mixture was then stripped at 175° C. and 5 mm. of Hg for 24 hours. The resulting ester had a hydroxyl number of 166 and an acid number of 0.33.

A mixture of 202 grams (0.3 mole) of the above polyester and 34.8 grams (0.2 mole) of tolylene diisocyanate was heated at 100° C. for two hours. This polyester trimer had a hydroxyl number of 47.45.

A mixture of 47.2 grams (0.02 mole) of the polyethylene adipate trimer and 10 grams (0.04 mole) of 4,4′-diphenylmethane diisocyanate was reacted at 85° C. for two hours and then cooled to 25° C. Dimethylformamide, 328 grams, was then added and the mixture stirred until all the solid had dissolved. 2800 p.p.m. (based on weight of ester diisocyanate) of phosphoric acid was added. Ethylenediamine (1.2 grams, 0.02 mole), dissolved in 94 grams of DMF, was then added to the flask. The solution was then cast onto glass plates and cured at 100° C. for 16 hours. The properties of the elastic film are shown below in Table III.

EVALUATION OF ELASTIC FILMS OF EXAMPLES 2-4

Technique

The stress-strain curves were obtained in the following manner:

(1) ASTM D 412 die C tensile dog bones, bench marked for one inch gauge lengths, were extended at an Instron crosshead rate of 20 inches per minute to a strain of 300 percent (as measured by the relative displacement of the bench marks); the loading portion of the loading-unloading cycle is indicated by line $o-a$ in the drawing.

(2) The samples were held at 300 percent elongation for 1 minute, during this time the stress due to extension "decays" as bonds between molecules break down and the molecular chains orient themselves in the direction of extension, this phenomenon is indicated by the line $a-b$.

(3) The crosshead of the tensile tester was returned to its original position at a rate of 20 inches per minute, note that the stress response of the samples to extension becomes zero before the specimen returns to the state of zero elongation (line $b-c$).

(4) After allowing one minute for the samples to "recover" they were strained at a rate of 20 inches per minute to rupture (line $e-f$). This measures ultimate tenacity.

Description of terms (1) *Permanent set*.—The distance $o-e$ in the figure is due to permanent set, percent increase in the distance between the bench marks, due to the loading-unloading cycle. This parameter has significance in that it indicates how well a garment will hold its shape. A woman's girdle made from a yarn with a large permanent set would increase in size with repeated wearing.

(2) *Stress decay*.—Stress decay is defined as the absolute decrease in stress ($\Delta \sigma$) divided by the original stress at point $a$. This ratio is most often expressed as a percentage. Stress decay and creep, extension of a sample with time when subjected to a constant load, are functionally related. A material exhibiting a large amount of stress decay will also exhibit a large amount of creep. A girdle made from a yarn exhibiting a large amount of creep would expand with time upon wearing and provide less and less support as the period of wearing increased.

(3) *Work recovery*.—The areas encompassed by the points $oad$ and $cbd$ are proportional, respectively, to the work done on the sample when extending it and the work given back by the sample when it is released. The ratio of the work returned by the sample to the work done on the sample is defined as work recovery. This parameter is a measure of how "snappy" the material is. High work recovery values are associated with materials of high snap.

(4) *Tension set*.—The amount of permanent increase in length due to holding a specimen at an elongation of 400 percent for 16 hours at 21° C. The strain level (400%) and the amount of permanent increase in length are determined by the relative displacement of gauge marks initially placed 1 inch apart. Tension set is measured 10 minutes after the strained sample is released.

The films of Examples 2-4 were evaluated as described above, and the results are set forth in Table III.

TABLE III.—PROPERTIES OF ELASTIC FILMS

| | Example No. | | |
|---|---|---|---|
| | 2 | 3 | 4 |
| Tensile strength, p.s.i. | 9,700 | 10,175 | 1,850 |
| Ultimate elongation, percent | 511 | 600 | 783 |
| Initial stress, p.s.i.: | | | |
| At 100% elongation | 1,140 | 475 | 680 |
| At 300% elongation | 3,350 | 1,160 | 1,000 |
| 300% strain: | | | |
| Stress decay | 24 | 28 | 45 |
| Work recovery | 53 | 50 | 18 |
| Permanent set, percent | 12 | 6 | 14 |
| 400% strain for 16 hours—percent tension set: | | | |
| After 10 minutes | 20 | 8 | 88 |
| After 10 seconds | 30 | 12 | 124 |

The preceding Examples 1-3 have illustrated one of the preferred embodiments of the invention wherein the hydroxyl-terminated organic polymer HO—L—OH is prepared by first reacting epsilon-caprolactone with a bifunctional initiator and secondly extending the thus formed caprolactone polymer with an aromatic diisocyanate that is either unsymmetrical or contains a substantially non-reactive pendant substituent group of both. This aromatic diisocyanate can be represented by the formula OCN—Aro—NCO In this preferred embodiment of the invention the polymer HO—L—OH is then reacted with a symmetrical or para-substituted aromatic diisocyanate (e.g., MDI) to form an isocyanato-terminated prepolymer. This symmetrical aromatic diisocyanate can be represented by the formula OCN—Ar—NCO. In the next step, the said prepolymer is reacted with an alkylenediamine such as ethylenediamine. The alkylenediamine can be represented by the formula $H_2N-R^5-NH_2$ wherein $R^5$ represents a divalent, saturated hydrocarbon group having at least 2 carbon atoms, for example up to 10 carbon atoms and preferably from 2 to 6 carbon atoms.

EXAMPLE 5

A series of elastic films were produced from hydroxyl-terminated organic polymers (HO—L—OH) comprising the reaction products of epsilon-caprolactone and diethylene glycol. Four different polymers were produced by reacting epsilon-caprolactone with diethylene glycol in the presence of 10 parts per million (based on weight of epsilon-caprolactone) of stannous octoate catalyst. The reaction conditions were analogous to those described above in Example 1 for the epsilon-caprolactone polymerization. The molecular weights of these four polymers were as follows:

| Sample | Molecular weight |
|---|---|
| A | 1745 |
| B | 1954 |
| C | 1965 |
| D | 2250 |

In each case, the above-described epsilon-caprolactone polymers were reacted with two equivalents of bis(4-isocyanatophenyl)methane to form an isocyanato-terminated prepolymer, which was then cured with one equivalent of ethylenediamine. The procedures employed were analogous to those described in the previous examples.

Representative properties of the elastic films produced from samples A-D were as follows:

| Sample | Tensile Strength, p.s.i. | Ultimate Elongation, Percent | Tension Set, Percent |
|---|---|---|---|
| A | 10,300 | 625 | 30 |
| B | 9,700 | 670 | 20 |
| C | 9,700 | 650 | 26 |
| D | 8,750 | 650 | 30 |

EXAMPLE 6

A series of elastic films were produced from hydroxyl-terminated organic polymers prepared by reacting an 80/20 (mole/mole) mixture of epsilon-caprolactone and methyl-epsilon-caprolactone with diethylene glycol as the initiator in the presence of 10 parts per million (based on weight of the lactones) of stannous octoate catalyst. The molecular weight of the three polymers were as follows:

| Sample: | Molecular Weight |
|---|---|
| A | 2060 |
| B | 2580 |
| C | 3195 |

The three polymers were then "capped" with bis(4-isocyanatophenyl)methane to form a prepolymer which was cured with ethylenediamine. Representative properties of elastic films prepared from each of these samples were as follows:

| Sample | Tensile Strength, p.s.i. | Ultimate Elongation, Percent | Tension Set, Percent |
|---|---|---|---|
| A | 7,200 | 725 | 34 |
| B | 7,030 | 700 | 22 |
| C | 4,750 | 825 | 30 |

EXAMPLE 7

A series of hydroxyl-terminated organic polymers was prepared by reacting various proportions of tolylene diisocyanate and an epsilon-caprolactone polymer initiated with diethylene glycol (and using 10 parts per million of stannous octoate as catalyst). The initial epsilon-caprolactone polymer had a molecular weight of 837. The molecular weights of the various tolylene diisocyanate-extended hydroxyl-terminated polymers were as follows:

| Sample: | Molecular Weight |
|---|---|
| A | 1915 |
| B | 2430 |
| C | 2915 |
| D | 3460 |
| E | 4280 |

The polymers A–E were then each capped with bis(4-isocyanatophenyl)methane and cured with ethylenediamine, by the procedure discussed above. Representative properties of the elastic films cast from these samples were as follows:

| Sample | Tensile Strength, p.s.i. | Ultimate Elongation, Percent | Tension Set, Percent |
|---|---|---|---|
| A | 10,600 | 600 | 30 |
| B | 9,410 | 650 | 30 |
| C | 9,060 | 610 | 20 |
| D | 7,400 | 713 | 20 |
| E | 3,675 | 821 | 30 |

EXAMPLE 8

A series of hydroxyl-terminated organic polymers were prepared by reacting 2 mole-equivalents of tolylene diisocyanate with 3 mole-equivalents of several epsilon-caprolactone polymers of varying molecular weight. The epsilon-caprolactone polymers were produced by reacting epsilon-caprolactone with diethylene glycol as the bifunctional initiator in the presence of 10 parts by weight per million of stannous octoate catalyst (based upon weight of epsilon-caprolactone). The molecular weights of both the initial epsilon-caprolactone polymer and the tolylene diisocyanate-extended hydroxyl-terminated polymer (i.e., HO—L—OH) for each sample were as follows:

| Sample | Molecular Weight of Initial Lactone Polymer | Molecular Weight of HO-L-OH |
|---|---|---|
| A | 520 | 2,010 |
| B | 1,010 | 3,345 |
| C | 1,466 | 4,920 |

Each of the above-described polymers was "capped" with bis(4-isocyanatophenyl)methane to form a prepolymer which was then cured with ethylenediamine by the usual methods. Representative properties of elastic films cast from each sample were as follows:

| Sample | Tensile Strength, p.s.i. | Ultimate Elongation, Percent | Tension Set, Percent |
|---|---|---|---|
| A | 10,400 | 492 | 40 |
| B | 8,000 | 675 | 20 |
| C | 7,300 | 781 | 12 |

EXAMPLE 9

To a stainless steel reactor equipped with a stirrer there is added 3180 grams (30 moles) of diethylene glycol, 21,330 grams (187.5 moles) of epsilon-caprolactone, and 0.24 gram of stannous octoate. The reaction mixture is then heated to 175–185° C. and maintained at this temperature until the refractive index is 1.4615. The mixture is cooled to 100° C. and 3760 grams (20 moles) of meta-xylene diisocyanate is added. The mixture is stirred at 100° C. for 6 hours to produce a diol having a hydroxyl number of 39.4.

A mixture of 114 grams (0.04 mole) of the above-described diol and 15.04 grams (0.08 mole) of para-xylylene diisocyanate is reacted at 85° C. for 4 hours and then cooled to 40° C. N,N-dimethylformamide (645 grams) is added to the prepolymer and the mixture is stirred until all the solid is dissolved. Phosphoric acid (2870 parts per million, based on weight of the prepolymer) is added to the solution. Ethylene diamine (2.16 grams; 0.036 mole) dissolved in 100 grams of N,N-dimethylformamide is then added to the mixture over a 5 minute period. This solution is then spun into a water bath to produce an elastic fiber which has a high tenacity and good recovery.

EXAMPLE 10

To a two-liter, four neck, round-bottom flask equipped with a stirrer, condenser, thermometer, and nitrogen inlet tube there is added 758 grams of epsilon-caprolactone, 189.4 grams of epsilon-methylcaprolactone, 53.06 grams of diethylene glycol and 0.10 gram of stannous octoate. The reaction mixture is then heated to 175–185° C. and maintained at this temperature until the refractive index at 50° C. was 1.4630. The mixture is cooled and analyzed. The diol has a hydroxyl number of 55.4.

A mixture of 80.80 grams (0.04 mole) of the above-described diol and 15.04 grams (.08 mole) of para-xylylene diisocyanate is reacted at 85° C. for 4 hours and then cooled to 40° C. N,N-dimethylformamide (450 grams) is added to the prepolymer and the mixture is stirred until all the solid has dissolved. Phosphoric acid (1000 parts per million (based on weight of the prepolymer) is added to the solution. Ethylene diamine (2.16 grams; 0.036 mole) dissolved in 100 grams of N,N-dimethylformamide is then added to the mixture over a 5 minute period. This solution is then spun into a water bath to produce an elastic fiber which has high tenacity and good recovery.

EXAMPLE 11

To a two-liter, four-neck, round-bottom flask equipped with a stirrer, condenser, thermometer, and nitrogen inlet tube there is added 758 grams of epsilon-caprolactone, 189.4 grams of 4,4-dimethyl-2,6-dioxacyclohexanone, 53.06 grams of diethylene glycol, and 0.10 gram of tetraisopropyltitanate. The reaction mixture is heated to 175–176° C. and maintained at this temperature until the refractive index at 50° C. is 1.4596. The mixture is cooled and analyzed. The diol has a hydroxyl number of 60.7 and an acid number of 0.25.

A mixture of 36.66 grams (0.02 mole) of the above described diol and 10.0 grams (0.04 mole) of diphenylmethanediisocyanate is reacted at 80° C. for two hours and then cooled to 40° C. N,N-dimethylformamide (170 grams) is added and the mixture stirred until all the solid is dissolved. Ethylenediamine (1.1 grams; 0.0183 mole) dissolved in 100 grams of N,N-dimethylformamide is then added to the mixture over a 5 minute period. The solution is cast onto glass plates and cured at 100° C. for 16 hours. The properties of the film were as follows:

| | |
|---|---|
| Tensile strength, p.s.i. | 10,400 |
| Ultimate elongation, percent | 650 |
| Initial stress, p.s.i.: | |
| At 100% elongation | 850 |
| At 300% elongation | 1,670 |
| 300% strain, work recovery | 34.8 |
| 400% strain for 16 hours, percent tension set after 10 minutes | 34 |

The molecular weights of the elastic lactone polymers of the invention are somewhat difficult to determine exactly, but they are sufficiently high so that the films and fibres of the invention possess desirable elastic properties. For example, it is desirable that the elastic compositions of the invention have tension set values of less than about 40 percent, preferably less than about 30 percent, and more preferably less than about 20 percent, as measured by the test procedure outlined above. It is further desirable that the elastic compositions of the invention have ultimate elongations of at least 400 percent, preferably at least 500 percent, and more preferably at least 600 percent. Another useful property is the tensile strength or tenacity. When the elastic compositions are employed in the form of films, it is desirable that the tensile strength be greater than 3000 pounds per square inch (p.s.i.), preferably greater than 5000 p.s.i., more preferably greater than 7000 p.s.i., and most preferably greater than 8000 p.s.i. When the elastic compositions are employed in the form of fibers, the tenacity is conveniently expressed as grams per denier, and is desirably at least about 0.2 gram per denier, preferably at least 0.5 gram per denier, and more preferably at least 0.7 gram per denier. The elastic fibers can be of conventional size, for example, from as low as about 1 denier to as high as 200 denier.

The invention also contemplates novel elastic fibers which have elongations as low as 150% which are highly useful in admixture with various natural and synthetic filaments and fibers such as wool, cotton, linen, and the like, and nylon, rayon, Dacron, and the like, to make a stretchable fabric or fiber.

What is claimed is:
1. An elastic fiber that is produced by the steps of:
 (a) reacting an epsilon-caprolactone with a bifunctional initiator to form a hydroxyl-terminated diol having a molecular weight in the range of from about 500 to about 1500,
 (b) reacting the product of step (a) with an organic diisocyanate in a molar ratio of the product of step (a): organic diisocyanate in the range of from 2:1 to 5:4, inclusive,
 (c) reacting the product of step (b) with an organic diisocyanate in a molar ratio of the product of step (b): organic diisocyanate in the range of from 1:1.5 to 1:2.5, inclusive, and
 (d) reacting the product of step (c) with slightly less than a stoichiometric amount of a diamine of up to 15 carbon atoms.

2. An elastic fiber made from a polyurethane prepared by (1) reacting to form an isocyanato-terminated prepolymer (a) a hydroxyl-terminated poly-(epsilon-caprolactone), said poly-(epsilon-caprolactone) comprising the reaction product of epsilon-caprolactone and a bifunctional initiator, with (b) an excess of an organic diisocyanate, and (2) thereafter reacting said prepolymer with ethylene diamine in an amount sufficient to react with essentially all of the free isocyanato groups on said prepolymer.

3. An elastic fiber that is produced by the steps of:
 (a) reacting epsilon-caprolactone with a dihydric alcohol to produce a hydroxyl-terminated diol having a molecular weight in the range of from about 500 to about 1500,
 (b) reacting the product of step (a) with tolylene diisocyanate in a molar ratio of product of step (a): tolylene diisocyanate in the range from 2:1 to 5:4, inclusive,
 (c) reacting the product of step (b) with bis(4-isocyanatophenyl)methane in a molar ratio of the product of step (b): bis(4-isocyanatophenyl)methane in the range of from 1:1.5 to 1:2.5, inclusive, and
 (d) reacting the product of step (c) with ethylenediamine in a molar ratio of the product of step (c): ethylenediamine in the range of from 0.9:1 to 1.2:1.

4. An elastic fiber that comprises the reaction product of:
 (a) a substantially linear, hydroxyl-terminated organic polymer having a molecular weight in the range of from about 700 to about 5000, a hydroxyl number in the range of from about 20 to about 170, a melting point below about 55° C., and containing at least about 50 mole percent of carbonylpentamethyleneoxy groups and at least about 5 mole percent of a divalent organic group selected from the class consisting of:
  (1) divalent organic groups that have at least one pendant substituent group that is substantially non-reactive with isocyanate;
  (2) unsymmetrical divalent organic groups; and
  (3) unsymmetrical divalent organic groups that have at least one pendant substituent group that is substantially non-reactive with isocyanate,
 (b) a symmetrical organic diisocyanate, and
 (c) a diamine of up to 15 carbon atoms containing two primary amino groups as the sole groups reactive with isocyanate,
wherein the composition defined in (a) is first reacted with a stoichiometric excess of the composition defined in (b) to form an isocyanato-terminated prepolymer, and wherein said prepolymer is then reacted with the composition defined in (c).

5. The elastic fiber of claim 4 wherein said symmetrical organic diisocyanate is bis(4-isocyanatophenyl)methane.

6. The elastic fiber of claim 4 wherein said diamine is ethylenediamine.

7. The elastic fiber of claim 4 wherein said hydroxyl-terminated organic polymer comprises the reaction product of:
 (A) a stoichiometric excess of a hydroxyl-terminated polymer formed by reacting epsilon-caprolactone with a bifunctional initiator, and
 (B) an organic diisocyanate.

8. The elastic fiber of claim 7 wherein said bifunctional initiator is a dihydric alcohol.

9. The elastic fiber of claim 8 wherein said dihydric alcohol is diethylene glycol.

10. The elastic fiber of claim 7 wherein said organic diisocyanate recited in (B) of claim 7 is tolylene diisocyanate.

11. The elastic fiber of claim 4 wherein said hydroxyl-terminated organic polymer comprises the reaction product of a mixture of epsilon-caprolactone and a substituted lactone with a bifunctional initiator.

12. The elastic fiber of claim 11 wherein said substituted lactone is a methyl-substituted lactone.

13. The elastic fiber of claim 12 wherein said methyl-substituted lactone is methyl-epsilon-caprolactone.

14. The elastic fiber of claim 4 wherein said hydroxyl-terminated organic polymer comprises the reaction product of a mixture of epsilon-caprolactone and a cyclic carbonate with a bifunctional initiator.

15. The elastic fiber of claim 14 wherein said cyclic carbonate is 4,4-dimethyl-2,6-dioxacyclohexanone.

(References on following page)

References Cited

UNITED STATES PATENTS

| | | | |
|---|---|---|---|
| 2,721,811 | 10/1955 | Dacey et al. | 117—65 |
| 2,729,618 | 1/1956 | Muller et al. | 260—75 |
| 2,755,266 | 7/1956 | Brenschede | 260—32.6 |
| 2,890,208 | 6/1959 | Young et al. | 260—78.3 |
| 2,914,556 | 11/1959 | Hostettler et al. | 260—484 |
| 2,929,804 | 3/1960 | Steuber | 260—77.5 |
| 2,933,477 | 4/1960 | Hostettler | 260—77.5 |
| 2,933,478 | 4/1960 | Young et al. | 260—77.5 |
| 2,957,852 | 10/1960 | Frankenburg et al. | 260—75 |
| 2,962,455 | 11/1960 | Hostettler et al. | 260—2.5 |
| 2,962,470 | 11/1960 | Jung | 260—858 |
| 2,962,524 | 11/1960 | Hostettler et al. | 260—484 |
| 3,051,687 | 8/1962 | Young et al. | 260—77.5 |
| 3,097,192 | 7/1963 | Schilit | 260—75 |
| 3,115,384 | 12/1963 | Cacella et al. | 264—184 |
| 3,169,945 | 2/1965 | Hostettler et al. | 260—78.3 |
| 3,186,971 | 6/1965 | Hostettler et al. | 260—77.5 |
| 3,280,078 | 10/1966 | Hostettler et al. | 260—77.5 |

DONALD E. CZAJA, Primary Examiner

M. J. WELSH, Assistant Examiner

U.S. Cl. X.R.

260—45.7, 45.95